United States Patent [19]

Hardy

[11] 4,016,788
[45] Apr. 12, 1977

[54] CONVEYOR SYSTEMS
[75] Inventor: Peter D. Hardy, Welwyn Garden City, England
[73] Assignee: The Metal Box Company Limited, Reading, England
[22] Filed: July 17, 1975
[21] Appl. No.: 596,753
[30] Foreign Application Priority Data
July 19, 1974 United Kingdom ............ 32062/74
July 19, 1974 United Kingdom ............ 32061/74
July 19, 1974 United Kingdom ............ 32033/74
[52] U.S. Cl. .................................... 83/72; 83/77; 83/79; 83/89; 198/436
[51] Int. Cl.² .................... B26D 7/06; B65G 47/26
[58] Field of Search ............ 198/31 R, 31 AB, 34; 83/72, 77, 79, 89

[56] References Cited
UNITED STATES PATENTS

| | | | |
|---|---|---|---|
| 3,115,237 | 12/1963 | Atkins | 198/34 |
| 3,731,782 | 5/1973 | Del Rosso | 198/31 R |
| 3,846,958 | 11/1974 | Divan | 83/89 X |

Primary Examiner—Willie G. Abercrombie
Attorney, Agent, or Firm—Diller, Brown, Ramik & Wight

[57] ABSTRACT

A conveyor handling system, includes three paths along which articles travel, and a diverter located in an intermediate portion of the paths and operative to effect transfer between the paths. Sensors located upstream and downstream of the diverter monitor the rate at which the articles arrive at and leave the diverter. A comparator is responsive to the downstream sensor to cause the diverter to direct the articles between the paths in such a sense as to maintain the rates of flow of articles along the three paths downstream of the diverter substantially equal. A control unit responds to the upstream sensor to determine whether there is sufficient space for each article to be transferred transversely of the direction of motion to an adjacent path without reducing a predetermined minimum spacing requirement for the articles in each path. If there is insufficient space to effect a transfer, the control unit acts to inhibit the diverter from performing such a transfer.

9 Claims, 11 Drawing Figures

CONVEYOR SYSTEMS

BACKGROUND OF THE INVENTION

1. Field of the Invention

The invention relates to conveyor systems for handling articles.

2. Description of Prior Art

In previously proposed packaging machines, where articles are fed in a random manner in two or more streams to a packaging station there was provided a separate packaging machine for each stream and a control for effecting the packaging action when the article reached a predetermined position in the machine. The use of individual machines for each stream however, is somewhat costly and the fact that the articles reach the machines with random spacing means that the machines are not always operating at their optimum rate.

It is an object of the invention to provide an improved conveyor system.

It is a further object of the invention to control the arrival of articles to the packaging station so that the articles in each stream have a fixed, predetermined, spacing between them and so that each article in each stream is aligned with corresponding articles in adjacent streams. This allows a single packaging machine to pack each column of aligned articles in one action and to operate at an optimum rate.

SUMMARY OF THE INVENTION

According to the invention, there is provided a conveyor handling system, comprising at least two paths along which articles travel, diverter means located in an intermediate portion of both said paths and operative to effect transfer between said paths, first sensing means located downstream of the diverter means for sensing the rate at which the articles arrive along each said path, comparison means responsive to the first sensing means to cause the diverter means to direct the articles between the paths in such a sense as to maintain substantially equal the rates of flow of articles along said paths downstream of the diverter means, second sensing means located upstream of the diverter means to sense the passage of articles along said paths and past a common datum line, and computer means responsive to the second sensing means to determine whether there is sufficient space for each article to be transferred transversely of the direction of motion to an adjacent path without reducing a predetermined minimum spacing requirement for the articles in each path, and if there is insufficient space to effect a transfer, to inhibit the diverter from performing such a transfer.

According to the invention there is also provided a conveyor handling system, comprising a slicer for slicing a block of material into slices, a conveyor located below the slicer to collect the slices as they fall from the slicer, the conveyor being arranged to move at such a speed that the slices are automatically shingled thereon, means for periodically accelerating the conveyor to separate the shingled slices into batches of shingled slices spaced by a predetermined distance from one another, a weigher located downstream of the conveyor to weight each batch in turn, a first diverter located downstream of the weigher and responsive to the weight registered by the weigher to divert the batches having a weight within a predetermined range along one path and to divert the batches having a weight outside said predetermined range along another path, a second diverter arranged to receive the batches travelling along said one path and distribute the batches equally along a plurality of paths, and spacing means located in said plurality of paths to accelerate each batch to reduce the spacing between itself and the preceding batch to a predetermined value.

BRIEF DESCRIPTION OF THE DRAWINGS

A conveyor system for handling sliced bacon and embodying the invention will now be described, by way of example, with reference to the accompanying diagrammatic drawings in which.

DESCRIPTION OF THE PREFERRED EMBODIMENTS

Figure 1:
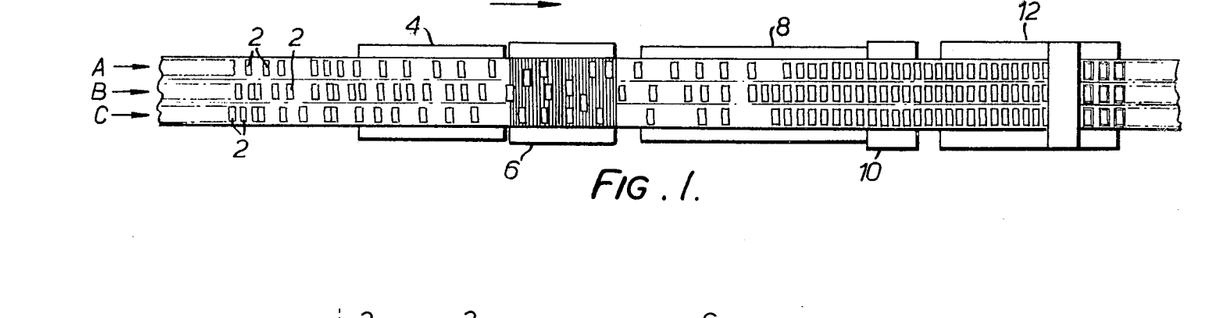
FIG. 1 is a plan view of one of the conveyor systems.
Figure 2:
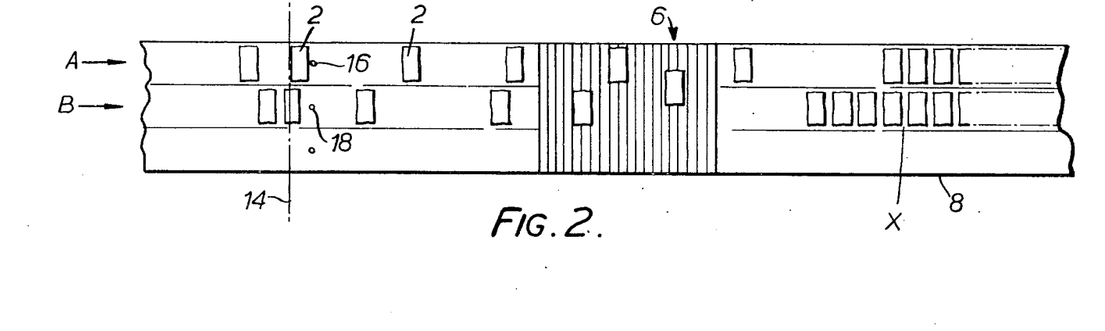
FIG. 2 is a plan view of a portion of the system of FIG. 1 to an enlarged scale.

The conveyor system shown in FIGS. 1 and 2 is arranged to receive three streams each containing a plurality of batches of bacon slices. The batches of bacon slices in each stream have random serial spacing or even no spacing therebetween and each batch has a predetermined desired weight. The conveyor system upon receiving the three streams introduces a minimum spacing between the batches of each stream, equalises the number of batches as between the streams, adjusts the spacing between the batches in each stream, and aligns the batches as between the streams so that at the other end of the conveyor system the batches from the three streams can be discharged at regular intervals in synchronism into a three-input bacon packing machine.

As shown in FIG. 1, the conveyor system provides a flow in three streams A, B and C, for carrying batches 2 of shingled bacon slices from left to right as indicated by the arrow.

Because there may be no spacing between some of the batches of bacon slices, the batches in each stream are fed through an accelerator unit 4 which produces a minimum spacing between adjacent batches of bacon slices.

The accelerator unit 4 is designed to serially receive stacks of shingled bacon slices with random serial spacing or even no serial spacing between them and to establish automatically a predetermined minimum spacing. The accelerator unit will be described in more detail hereinafter with reference to FIGS. 5 to 7.

Briefly, however, the accelerator unit comprises two endless belts extending between the first and second positions and arranged to be driven at different speeds in the same sense. A carriage is movable between the first and second positions and constrains intermediate portions of the endless belts in such a manner that one belt forms the upper run of the conveyor system to one side of a datum position on the carriage and the other belt forms the upper run of the conveyor system on the other side of the datum position. Movement of the carriage between its first and second positions will vary the lengths of the belts which define the upper run. Sensing means are mounted on the carriage and are arranged to sense when an article on the upper run of the conveyor reaches the datum point. A control device is activated when the sensing means responds to the approach of an article and causes the carriage to reciprocate.

The forward stroke of the carriage effects the transfer of the article from the slow to the fast belt substantially instantaneously while the return stroke is arranged to take place at a speed at least equal to that of the slow belt but not exceeding that of the fast belt thereby to effect a minimum spacing between successive articles.

The separated batches 2 then pass through a three way diverter 6 which operates in response to a control system and will be described in more detail hereinafter, to equalise the batches in the three streams.

The equalised stream then each pass through an aligning and spacing unit 8 which effects a predetermined spacing between the batches in each stream and aligns the batches in each stream.

The aligning and spacing unit 8 is arranged to receive stacks of bacon slices having a random but minimum serial spacing between stacks, and to automatically space them apart by a constant predetermined distance. The aligning and spacing unit will be described in more detail hereinafter with reference to FIG. 8.

Briefly, however, the aligning and spacing unit comprises two endless belts extending between the first and second positions and arranged to be driven at different speeds in the same sense. A carriage is arranged to be driven between the first and second positions in synchronism with the slower belt. The carriage constrains intermediate portions of the endless belts in such a manner that one belt forms the upper run of the conveyor system to one side of a datum position on the carriage and the other belt forms the upper run of the conveyor system on the other side of the datum position. Movement of the carriage between its first and second positions will vary the lengths of the belts which define the upper run. Sensing means are mounted on the carriage and are arranged to sense when an article on the upper run of the conveyor reaches the datum point. A control device is activated when the sensing means responds to the approach of an article and retards the movement of the carriage relative to the slow belt to effect transfer of the article from the fast to the slow belt, thereafter allowing the carriage to continue in synchronism with the slow belt thereby to effect a uniform spacing between the articles.

If very high accuracy of aligning and spacing is required the three streams can be fed through another such aligning and spacing unit which will act as a final positioner 10.

Finally, the three streams of equally spaced and aligned batches 2 of bacon slices are fed to a packing machine 12 for vacuum packing in transparent plastic envelopes.

The construction and operation of the three way diverter will now be described in more detail with reference to FIG. 2. As shown in FIG. 2, the diverter 6 can take the form of an "Autoscale Autovector" (manufactured by Best Inspection Ltd. of London, U.K.) which is based on the floating plaque principle and enables articles flowing in a single stream to be separated into three or more streams and vice versa. Alternatively, articles flowing in three streams can be transferred from any one to any other of the three streams in response to control signals.

In order to simplify the description, it will be assumed initially that there are only two streams A and B.

The control system (see FIG. 3) for controlling the diverter includes sensing devices 50A and 50B which respectively sense the numbers of correctly spaced batches in streams A and B on the spacing unit 8. Since the number of correctly spaced batches in each stream will be directly related to the position of the movable carriage of the unit 8 in that stream, each sensing device can advantageously be arranged to sense the position of the carriage of the unit 8 in its corresponding stream.

Figure 3:
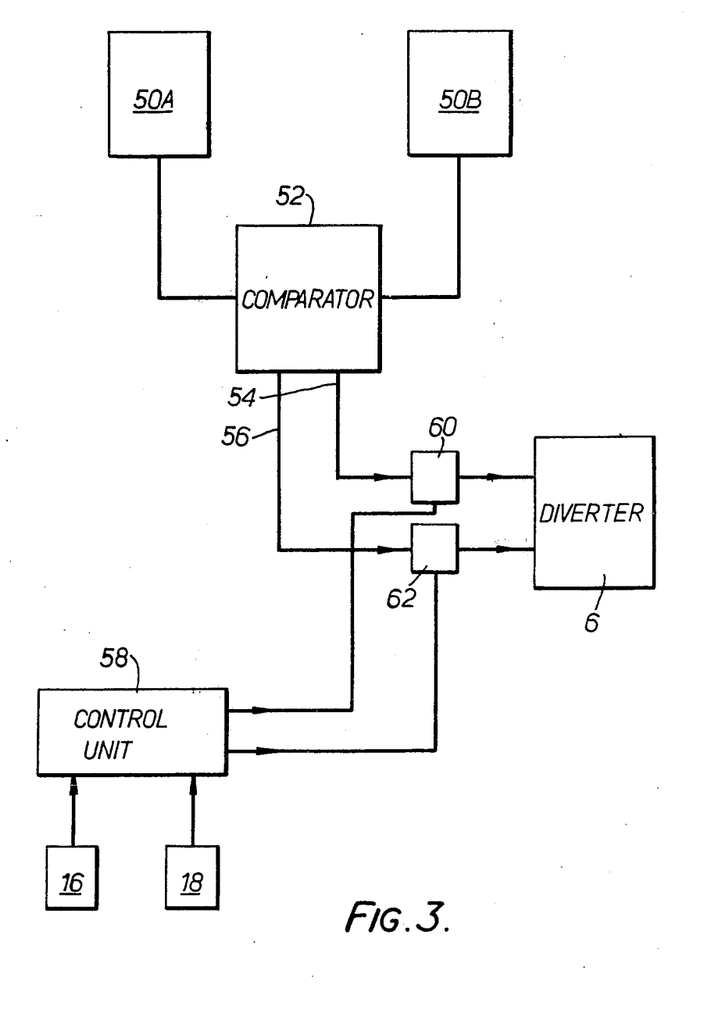
FIG. 3 is a block diagram of the control system for the conveyor system of FIGS. 1 and 2.
Figure 4:
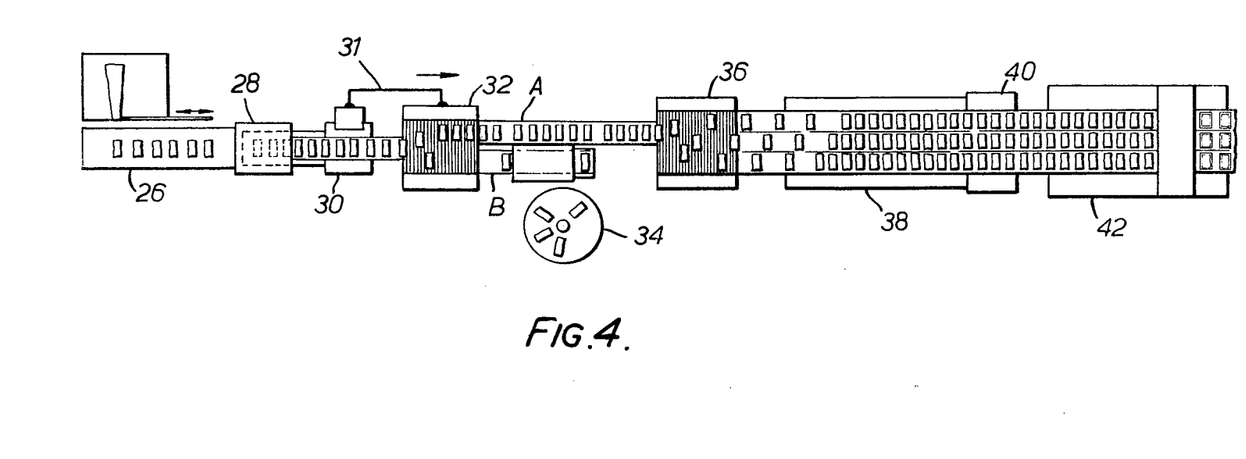
FIG. 4 is a plan view of another of the conveyor systems.

The outputs of the two sensing devices 50A and 50B are compared by a comparator 52 and if, say, the stream A contains more batches than the stream B, a control signal is sent back to the diverter 6 along line 54 to transfer batches from stream A to stream B until the comparator senses equality between streams A and B. Of course if stream B contains more batches than stream A then the comparator will generate a control signal along line 56 to cause the diverter to transfer batches from stream B to stream A.

If the two batches incoming from the accelerator unit 4 in the two streams A and B are in overlapping relation or separated by a daylight clearance, which is equal to or less than the desired spacing X between successive batches in a stream at the output of the unit 8, the control signals from the comparator to the diverter 6 are inhibited by gates 60 and 62 to prevent transfer.

The decision to inhibit is determined in response to the output from photocells 16 and 18 which are incorporated in the accelerator 4. Each of these photocells gives an output when a batch of bacon slices in the corresponding stream reaches a datum line 14. The dimension of each batch in the direction of motion will hereinafter be referred to as one pitch.

The output from the photocells 16 and 18 enables a control unit 58 to determine the separation between adjacent batches of streams A and B emerging from the accelerator 4. The control unit 58 is arranged to operate in the following manner. The control unit 58 may comprise a computer.

If the leading edge of a particular batch in one stream (say stream A) arrives at the datum line within the distance X of the trailing edge of an earlier batch in stream B then the transfer of that particular batch is inhibited.

If the trailing edge of the same particular batch in stream A precedes the leading edge of the next following batch in stream B by less than the distance X then the transfer of the particular batch is also inhibited. Similar criteria for inhibiting the transfer of a batch from stream B to stream A apply.

It will be appreciated that the application of the above criteria to inhibit transfers between streams A and B will ensure that adjacent batches in the same stream reaching the spacing unit 8 will be spaced apart by at least the distance X, provided that a sufficient minimum spacing has been introduced by the accelerator 4. Where the distance X is half a pitch, the accelerator 4, will be required to provide a minimum spacing of 2 pitches.

It will be appreciated that a more complex program based on the same principle can be provided to equalise the batches between three streams.

FIG. 3 shows another conveyor handling system which is arranged to receive bacon slices as they are cut from a piece of bacon and to form three streams in which batches of bacon slices of equal weight are separated by the same predetermined distance and are aligned.

The bacon slices as they are cut from the bacon slicer fall onto a conveyor 26 which separates them into batches each having equal numbers of slices. This conveyor is actuatable in response to a predetermined number of slices of meat being deposited on the conveyor to accelerate the slices in the same direction as they are moving so as to separate them from the next batch of shingled slices deposited on the conveyor from the slices. The conveyor will be described hereinafter in more detail with reference to FIGS. 9 to 11.

Briefly, however, this conveyor comprises two endless belts extending between first and second locations and arranged to be driven at the same predetermined speed in the same sense. A carriage is movable between the first and second locations and constrains intermediate portions of the endless belts so that a first one of the belts forms the upper run of an intermediate portion of the conveyor system and the second one of the belts forms the upper run of the conveyor system both upstream and downstream of the intermediate portion. The carriage is arranged to be reciprocated at a speed greater than the predetermined speed between a first position where the said intermediate portion lies adjacent a loading position at which the stream of slices are to be loaded on to the conveyor system and a second position where the upstream portion of the conveyor lies adjacent the loading position. One way clutches are provided for locking the first belt to the carriage when the carriage performs its forward stroke from the first to the second position so as to accelerate the first belt and therefore the intermediate portion. The one way clutches however allow the first belt to move freely relative to the carriage during the return stroke so that the first belt and therefore the intermediate portion moves at its predetermined speed during the return stroke of the carriage.

The separated batches then pass through an automatic weigher 30 to a two-way diverter 32 (which may be in the form of an "Autoscale Autovector" (manufactured by Best Inspection Ltd.) which is based on the floating plaque principle. If the weight of the batch lies within the acceptable range of the desired weight, a signal is sent along line 31 from the weigher 30 to the diverter 32 to divert the batch into a stream A. If the weight lies outside the acceptable range, a signal is sent to the diverter 32 to divert the batch into a stream B.

The stream B is fed to an operator who, after adjusting the weight of the batches to within the acceptable range, returns the corrected batches to the stream A. An accumulator 34 is provided to enable storage of batches having the incorrect weight. The stream A then passes to a three-way diverter 36 which again diverts the batches in rotation into three streams, thus ensuring that each stream has an equal number of batches. The three streams then pass through an aligning and spacing unit 38 (similar to the aligning and spacing unit 8 of FIGS. 1 to 3) which effects a predetermined spacing between the batches in each stream and aligns the batches as between the streams.

If very high accuracy of aligning and spacing is required, the three streams can be fed through another such aligning and spacing unit which will act as a final positioner 40.

Finally the three streams of equally spaced and aligned batches of bacon slices are fed to a packing machine 42 for vacuum packing in transparent plastic envelopes.

It will be appreciated that the conveyor handling systems described can be used for handling meats other than bacon and articles other than meats.

Figure 5:
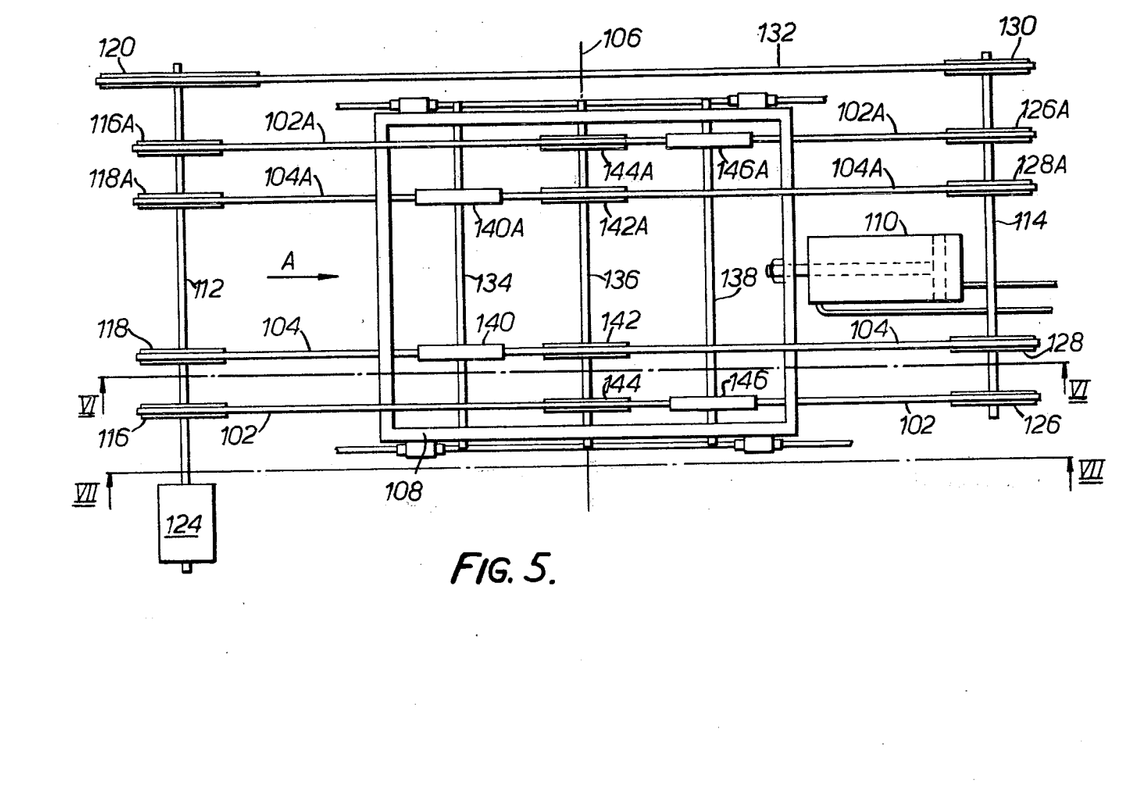
FIG. 5 is a fragmentary plan view of an accelerator unit of the conveyor system of FIG. 1.

The accelerator unit 4 of FIG. 1 will now be described in more detail with reference to FIGS. 5 to 7. As shown in FIG. 5, the forward direction of the conveyor system is indicated by arrow A. The system includes two pairs of endless belts 102 and 102A and 104 and 104A. The two belts 102 and 102A provide the upstream portion of the upper run of the conveyor, while the two belts 104 and 104A provide the downstream portion of the upper run of the conveyor. The belts 104 and 104A are arranged to be driven advantageously at three times the speed of the belts 102 and 102A so that at the junction 106 between the upstream and downstream portions of the upper run of the conveyor an abrupt change in speed occurs. The belts 102, 102A, 104 and 104A at this junction 106 extend around pulleys (which will be described in more detail hereinafter) carried by a movable carriage 108. The carriage 108 is arranged to be reciprocated in a direction parallel to the upper run of the conveyor by a piston and cylinder arrangement 110 and this in turn enables the junction 106 to reciprocate.

Two rotary shafts 112 and 114 lying at opposite ends of the conveyor each carry five pulleys.

Of the five pulleys carried by the shaft 112, three pulleys 116, 116A and 120 are rigid with the shaft while two pulleys 118 and 118A are rotatable relative to the shaft. Of the five pulleys carried by the shaft 114, three pulleys 128, 128A and 130 are rigid with the shaft while two pulleys 126 and 126A are rotatable relative to the shaft. The shaft 112 is rotated by a motor 124. An endless belt 132 which couples the pulleys 120 and 130 enables the rotation of the shaft 112 to be transmitted to the shaft 114. The relative diameters of the pulleys 120 and 130 are such that when the shaft 112 is rotated, it causes the shaft 114 to be rotated at three times the speed.

The carriage 108, which is located between the shafts 112 and 114, is arranged to run on rails 152 (FIG. 8) extending between shafts 112 and 114.

The carriage 108 carries three spaced shafts 134, 136 and 138 each of which is parallel to and lies in the same common plane containing the shafts 112 and 114. The shaft 134 carries independently rotatable pulleys 140 and 140A, the shaft 36 carries independently rotatable pulleys 142, 142A, 144 and 144A and the shaft 138 carries independently rotatable pulleys 146 and 146A.

Figures 6, 7:
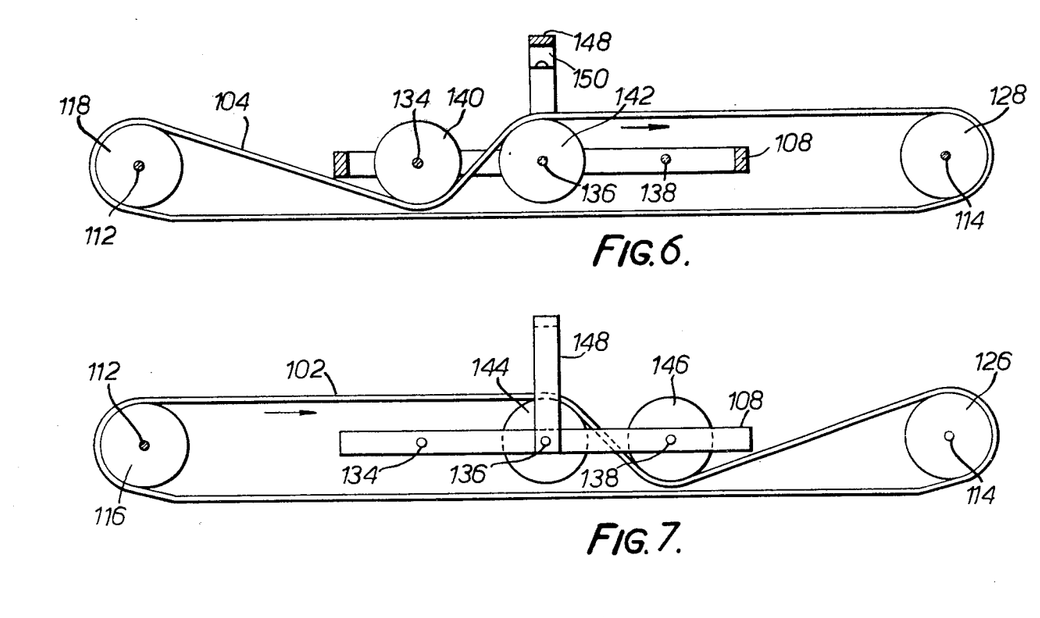
FIG. 6 is a view taken on the line IV—IV of FIG. 5.
FIG. 7 is a view taken on the line IIV—IIV of FIG. 5.

The pulleys 116, 144, 146 and 126 all lie in the same plane and are linked by the endless belt 102 in the manner indicated in FIG. 7.

The pulleys 116A, 144A, 146A and 126A all lie in the same plane and are linked by the endless belt 102A in a manner similar to that indicated in FIG. 7.

The pulleys 118, 140, 142 and 128 all lie in the same plane and are linked by the endless belt 104 in the manner indicated in FIG. 6.

The pulleys 118A, 140A, 142A and 128A all lie in the same plane and are linked by the endless belt 104A in a manner similar to that indicated in FIG. 6.

The carriage 108 has an inverted U-shaped bracket 148 (not shown in FIG. 5) which carries a photo cell (see FIG. 6).

In operation, shingled stacks of bacon slices are deposited in succession on the conveyor at the upstream end (as by hand or from another conveyor not shown) and are carried from left to right as viewed in FIG. 5 by the two belts 102 and 102A. The stacks have random or even no serial spacing between them. As each group approaches the change of speed line 106, its leading edge is detected by the photo cell 150 mounted on the carriage 108. When it detects the leading edge of a stack, the photo cell generates an output signal which is used to trigger the piston and cylinder arrangement 110 and so drive the carriage rapidly upstream of the conveyor by a predetermined distance. The distance that the conveyor is displaced is preset to correspond with the average dimension of each stack of bacon slices taken in the direction of movement of the conveyor. As a result of this movement of the carriage, the junction 106 is displaced rapidly underneath the stack of bacon slices to cause a rapid transfer of the group from the belts 102 and 102A to the belts 104 and 104A.

Upon completion of the transfer, the transferred group of bacon slices will now travel at three times the speed of the next following stack of bacon slices on the upstream portion of the conveyor because the transferred stack is now being carried by the faster moving belts 104 and 104A.

At this point, the piston and cylinder 110 will automatically be actuated to perform a return stroke which will return the carriage to its initial position at a speed not less than that of the belts 102 and 102A but not greater than the speed of the belts 104 and 104A.

After the carriage has returned to its initial position, the leading edge of the next following stack of bacon slices will be detected by the photocell and the cycle will be repeated.

It will be appreciated that if two stacks of bacon slices are placed on the upstream portion of the conveyor in abutting relationship, then the separation of the groups after both have been transferred to the downstream portion will be equal to twice the stroke of the piston and cylinder arrangement 110. It will also be appreciated that the provision of the carriage in effecting a very rapid transfer of each group of bacon slices from the slow to the fast belts of the conveyor prevents any substantial increase in skew of a stack of bacon slices, which would otherwise occur if a group of bacon slices arrived askew at the junction 106 and the junction 106 were to be maintained stationary. In addition the possibility of causing skew, and separating slices in the group, where the group of bacon slices are irregular in shape can also be reduced.

Figure 8:
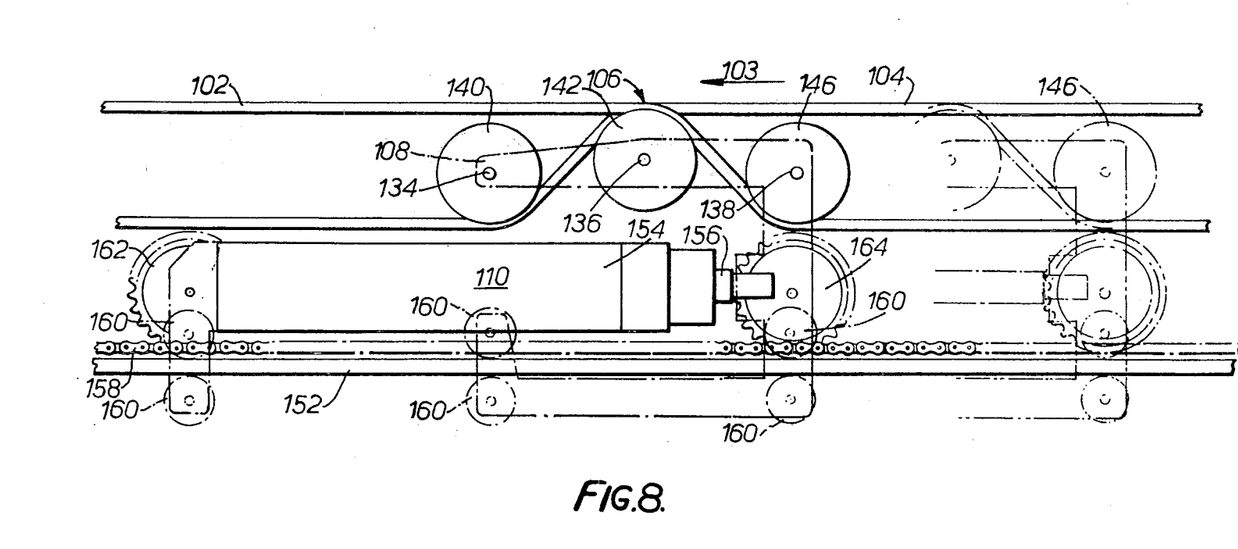
FIG. 8 is a fragmentary side elevation of an aligning and spacing unit of the conveyor system of FIG. 1.

The spacing unit 8 of FIG. 1 will now be described in more detail with reference to FIG. 8. The spacing unit of FIG. 8 is similar in construction to the accelerator unit of FIGS. 5 to 7 except that the cylinder of the piston and cylinder arrangement 10 is mounted on a drive chain assembly for movement in a direction parallel with the upper run of the conveyor. Parts in FIG. 8 similar to those in FIGS. 5 to 7 are similarly referenced.

As shown in FIG. 8, the carriage 108 is mounted by means of wheels 160 on a pair of rails 152 (only one shown) lying below the lower run of the conveyor system. The piston 156 of the piston and cylinder arrangement is rigidly secured to the carriage 108 and an endless link chain 158 extends along the centre line of the conveyor between the rails 152, its return run (not shown) passing below the plane of the rails 152. A sprocket wheel 162 which engages the upper run of link chain 158 is mounted on a shaft rigid with the cylinder 155 and rotatable relative to the shaft through a one way clutch (not shown). A second sprocket wheel 164, which also engages the upperrun of the link chain 158 is mounted on a shaft rigid with the piston 156 of the arrangement 110 and rotatable relative to the shaft through another one way clutch. The two one way clutches are arranged so that they will only allow the wheel 162 and 164 to rotate in a clockwise sense (as viewed in FIG. 8). Thus upon each reciprocation of the piston and cylinder arrangement 110, the arrangement 110 will move relative to the chain 158 towards the right hand end as viewed in FIG. 8. The link chain 158 is coupled to be driven in synchronism with the belt 102 through an epicyclic gear system (not shown). The epicyclic gear system includes a motor (not shown) which when energised can effect relative displacement between the belt 102 and the chain 158.

In operation, the conveyor of FIG. 8 is driven in the reverse sense to that of FIGS. 5 and 6. Thus spaced stacks of bacon slices placed on the right hand end of the conveyor (as viewed in FIG. 8) will travel from right to left as indicated by arrow 103, and the upstream portion of the conveyor travels faster than the downstream portion.

It will be assumed that a first stack of bacon slices has just been transferred from the belts 104 and 104A to the belts 102 and 102A, that the piston and cylinder arrangement 110 have just performed a forward stroke (this is, the piston has extended), and that a second stack of bacon slices on the belts 104 and 104A is approaching the junction 106. At this time, the carriage 108 is being driven by the chain 158 at the same speed as the belts 102 and 102A. Since the belts 104 and 104A are moving faster than the belts 102 and 102A and the carriage 108, the second stack will eventually reach the junction 106. This will be detected by the photo cell 150 which will trigger the piston and cylinder arrangement to perform a return stroke (that is, to retract the piston). Because of the one way clutch associated with the sprocket wheel 164, the wheel 164 will be locked against rotation but the one way clutch associated with the sprocket wheel 162 will allow the wheel 162 to rotate. Thus the cylinder 154 together with the carriage 108 are rapidly displaced in an upstream direction. This causes the junction 106 between the fast and slow moving belts to pass rapidly under the second bacon stack thereby transferring the second stack from the fast upstream side to the slower downstream side of the conveyor. Thereafter the piston and cylinder arrangement automatically performs the next forward stroke. The one way clutch associated with the sprocket wheel 162 prevents the carriage moving relative to the chain so that during the forward stroke the carriage will remain moving in synchronism with the belt 102 but the piston will extend.

The cycle is then repeated.

The stroke of the cylinder and piston arrangement is preset to a value equal to the average dimension of a stack of bacon slices in the direction of movement of the upper run of the conveyor, plus the desired spacing between stacks.

It will be appreciated that the stacks of bacon slices transferred to the downstream portion of the conveyor will thus be spaced from one another by the desired constant interval.

The conveyor advantageously delivers the stacks of bacon slices to a packaging machine and in order to maintain synchronism between the operation of the packaging machine and the time of delivery of the stacks of bacon slices sensing means are provided to generate an error signal indicative of the magnitude of any timing error. This error signal is fed to a control circuit (not shown) which energises the drive motor of the epicyclic gear (not shown) and so adjust the position of the chain 158 and therefore that of the carriage relative to the belt 102 (so as to adjust the time of arrival of subsequent stacks at the packaging machine), in a sense to reduce this timing error to zero.

It will also be appreciated the mean operating position of the carriage will move up and down the conveyor in dependence upon the spacing between the stacks of bacon slices delivered to the upstream portion of the conveyor. Accordingly photoelectric sensing means (not shown) are provided adjacent opposite ends of the conveyor to respond to the approach of the carriage by giving an alarm signal indicating that too few or too many stacks of bacon slices are reaching the upstream end of the conveyor.

Figure 9:
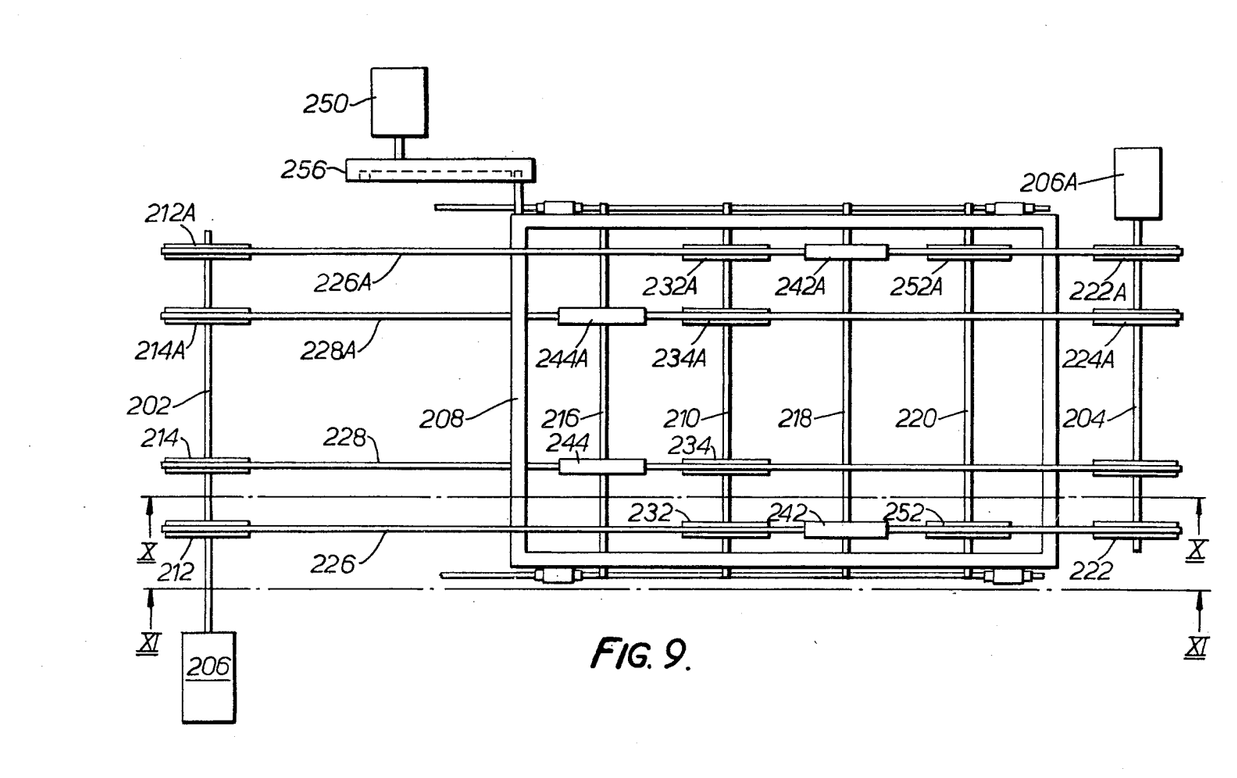
FIG. 9 is a plan view of one of the conveyors of FIG. 1.

The conveyor arranged to operate in conjunction with the meat slicer will now be described in more detail in conjunction with FIGS. 9 to 11. The conveyor shown in FIG. 9 is arranged to operate in conjunction with a meat slicer (not shown) which deposits each slice of meat as it is cut onto the upper run of the conveyor at the upstream end thereof. The conveyor as viewed in FIG. 9 moves from right to left. The conveyor moves at such speed relative to the slicing rate that as the meat slices fall on the moving conveyor, they are automatically shingled (this is, arranged along the conveyor in partially overlapping form).

The conveyor is actuatable in response to a predetermined number of slices of meat being deposited on the conveyor to accelerate the slices in the same direction as that in which they are moving so as to separate them from the next batch of shingled slices which are deposited on the conveyor from the slicer.

As shown in FIG. 9 the conveyor includes two shafts 202 and 204 lying at opposite ends of the system. The shaft 202 which is arranged to be driven by a motor 206 carries two pairs of pulleys 212, 212A and 214, 214A. The pulleys 212 and 212A are rigid with the shaft 202 while the pulleys 214 and 214A are coupled to the shaft through respective one way clutches (not shown). The one way clutches are such that when the shaft 202 is driven in a clockwise sense (as viewed in FIGS. 10 and 11) by the motor 106 all four pulleys are driven.

The shaft 204 also carries two pairs of pulleys 222, 222A and 224, 224A. These pulleys are freely rotatable on the shaft 204. Instead a separate shaft can be provided for each pair of pulleys and each pair of pulleys secured to their corresponding shaft.

A movable carriage 208 is supported on rails (not shown) for movement to and fro between the two shafts 202 and 204. The carriage 8 carries four rotary shafts 216, 210, 218 and 220 which lie spaced from one another and extend parallel to the shafts 202 and 204. The shaft 210 carries two pairs of pulleys 232, 232A and 234, 234A. The pulleys 232 and 232A are rigid with the shaft 210 while the pulleys 234 and 234A are connected to the shaft 210 through one way clutches (not shown). These one way clutches allow movement of the pulleys 234 and 234A relative to the shaft 210 in the same sense as the clutches associated with the pulleys 214 and 214A allow movement of these relative to the shaft 202. The shaft 216 carries a pair of pulleys 244 and 244A rigid therewith, the shaft 218 carries a pair of pulleys 242 and 242A rigid therewith and the shaft 220 carries a pair of pulleys 252 and 252A rigid therewith.

The pulleys 212, 232, 242, 252, and 222 all lie in the same plane and are linked by an endless belt 226. The pulleys 212A, 232A, 242A, 252A and 222A all lie in the same plane and are linked by an endless belt 226A. The pulley 214, 244, 234 and 224 all lie in the same plane and are linked by an endless belt 228. The pulleys 214A, 244A, 234A and 224A all lie in the same plane and are linked by an endless belt 228A.

Figure 10:
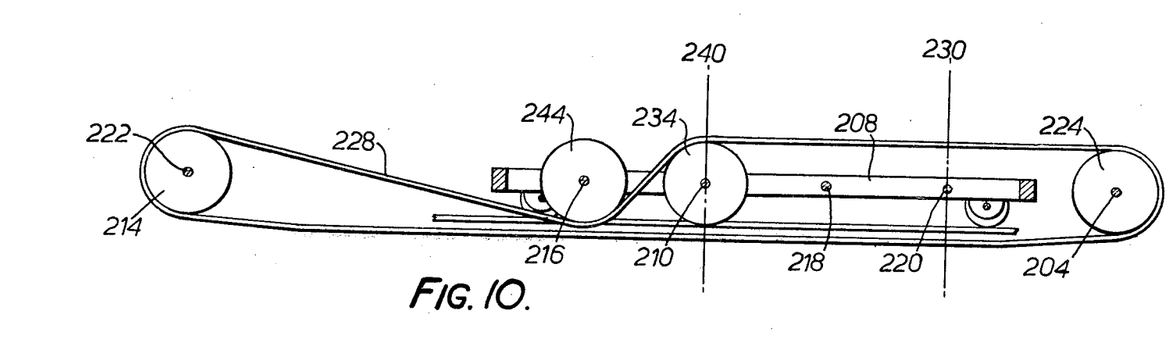
FIG. 10 is a longitudinal section of the conveyor of FIG. 4 taken on the line X—X of FIG. 9.
Figure 11:
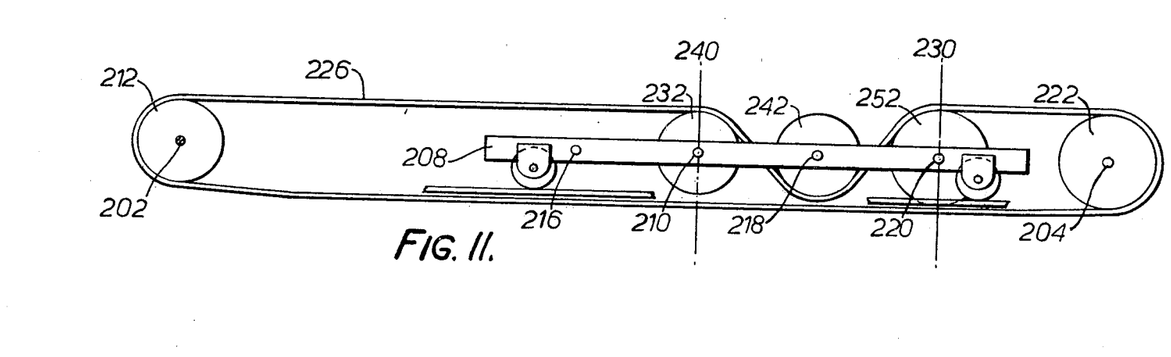
FIG. 11 is a longitudinal section of the conveyor of FIG. 1 taken on the line IX—IX of FIG. 9.

The four belts are supported on their corresponding pulleys in the manner indicated in FIGS. 10 and 11, the belts 226A and 228A being respectively arranged in the same manner as are belts 226 and 228. As can be seen, the pair of belts 226 and 226A define the downstream portion of the upper run of the conveyor system and the pair of belts 228 and 228A define an intermediate portion of the upper run of the conveyor system. The pair of belts 226 and 226A also form the upstream portion of the upper run of the conveyor system by virtue of their being raised slightly above the level of the rest of the upper run of the conveyor system (as by making the pulleys 252, 252A, 222, 222A of slightly larger diameter).

Thus as shown in FIGS. 10 and 11, the upper run of the conveyor belt is divided into three portions, the upstream and intermediate portions having a junction 230 and the intermediate and downstream portions having a junction 240. Displacement of the carriage 208 to the left hand side as viewed in FIGS. 10 and 11 will simultaneously displace the two junctions in the same direction and so increase the length of the upstream portion and provide a corresponding decrease in the length of the downstream portion of the conveyor. Movement of the carriage 8 in the opposite sense will produce the opposite effect. The intermediate portion remains unchanged in length.

The carriage is arranged to reciprocate between a fixed upstream position and a fixed downstream position under the action of a cam mechanism (not shown) which is coupled to operate in synchronism with the meat slicer.

In operation, slices of meat fall continuously and at regular intervals from the slicer onto a datum position on the conveyor which at this point in time is assumed to be occupied by the intermediate portion of the conveyor. Since all four belts are being driven by the motor 206 at the appropriate speeds, the slices falling on the belt will automatically be shingled. After a predetermined number of slices have fallen on the intermediate portion, the cam mechanism is actuated by control means 50 to shoot the carriage into its downstream position. The speed with which the carriage is displaced is faster than the speed at which the belts are driven by the motor 206. Accordingly, the two belts 228 and 228A are locked to conveyor 208 by virtue of the four one way clutches and displaced relative to the belts 226 and 226A. This accelerates the slices of meat so fast away from the datum position that the next slice to fall from the slicer now falls on the upstream portion of the conveyor to start a fresh batch of shingled slices.

When the carriage reaches its downstream position, the belts 228 and 228A resume their movement under the action of the motor 206. Thereafter the carriage 208 is returned to its upstream position to cause the separated batch of shingled slices to be transferred to the downstream portion of the conveyor and to cause the second batch of meat slices to be transferred to the intermediate portion of the conveyor.

The return movement of the carriage does not affect the speed of the belts 228 and 228A since the one way clutches will be allowed to rotate freely relative to their corresponding shafts.

The conveyor handling system is now ready for another cycle.

The two belts 226 and 226A are arranged to be intermittently accelerated so that they move slightly faster than the belts 228 and 228A during the interval that the slices are falling on the belts 228 and 228A and thereby avoid bunching the batches of slices when they are transferred from the intermediate portion of the conveyor to the downstream portion. This can be achieved by providing one way clutches between the pulleys 212 and 212A and the shaft 202.

The endless belts are preferably of circular crosssection and made of polyurethane.

I claim:
1. A conveyor handling system, comprising
   means defining at least two paths along which articles travel,
   diverter means located in an intermediate portion of both said paths and operative to effect transfer between said paths,
   first sensing means located downstream of the diverter means for sensing the rate at which the articles arrive along each said path,
   comparison means responsive to the first sensing means to cause the diverter means to direct the articles between the paths in such a sense as to maintain the rates of flow of articles along said paths downstream of the diverter means substantially equal,
   second sensing means located upstream of the diverter means to sense the passage of articles along said paths and past a common datum line, and
   a control unit responsive to the second sensing means to determine whether there is sufficient space for each article to be transferred transversely of the direction of motion to an adjacent path without reducing a predetermined minimum spacing requirement for the article in each path, and if there is insufficient space to effect a transfer, to inhibit the diverter means from performing such a transfer.

2. A system according to claim 1, including spacing means located downstream of the diverter means in each path, each spacing means being responsive to the arrival of a said article to accelerate the article to reduce the spacing between the article and the preceding article in the same path to a predetermined value less than said predetermined minimum spacing.

3. A system according to claim 2, including means interconnecting the spacing means in each path to control the spacing means so that the articles which have been accelerated are in alignment transversely of the direction of motion.

4. A system according to claim 2, wherein each spacing means includes a detector for sensing the arrival of each article at the spacing means, said detectors forming said first sensing means.

5. A system according to claim 1, including separator means located in each path upstream of the diverter means, each separator means being responsive to the arrival of each article to decelerate said article to space it from the preceding article by said predetermined minimum spacing.

6. A system according to claim 5, wherein each separator means includes a sensor for sensing the arrival of each article at the separating means, the sensors forming said second sensing means.

7. A conveyor handling system, comprising
   a slicer for slicing a block of material into slices,
   a conveyor located below the slices to collect the slices as they fall from the slicer, the conveyor being arranged to move at such a speed that the slices are automatically shingled thereon,
   means for periodically accelerating the conveyor to separate the shingled slices into the batches of shingled slices spaced by a predetermined distance from one another,
   a weigher located downstream of the conveyor to weigh each batch in turn,
   a first diverter located downstream of the weigher and responsive to the weight registered by the weigher to divert the batches having a weight within a predetermined range along one path and to divert the batches having a weight outside said predetermined range along another path,
   a second diverter located in said one path downstream of the first diverter and operative to distribute the batches equally along a plurality of paths, and
   spacing means located in said plurality of paths to accelerate each batch to reduce the spacing between itself and the preceding batch to a predetermined value.

8. A system according to claim 7, including means interconnecting the spacing means in each path to control the spacing means so that the articles in the plurality of paths which have been accelerated are in alignment transversely of the direction of motion.

9. A system according to claim 1 together with
   a slicer for slicing a block of material into falling slices,
   conveyor means located below the location of falling slices to collect slices as they fall from said slicer, said conveyor means moving at a speed in correspondence to the operation of said slicer wherein falling slices are automatically shingled therein,
   means coupled to said conveyor means for periodically accelerating said conveyor means to separate shingled slices into batches of shingled slices spaced by a predetermined distance from one another,
   a weigher located downstream of said conveyor means for weighing each batch in turn,
   said diverter means including means located downstream of said weigher and responsive to weights registered by said weigher to divert batches having weights within a predetermined range along one of said paths and to divert batches having weights outside of said predetermined range along another of said paths.

* * * * *